United States Patent
Hazelet et al.

(10) Patent No.: US 8,719,824 B2
(45) Date of Patent: May 6, 2014

(54) DYNAMICALLY CONFIGURABLE COMMAND AND CONTROL SYSTEMS AND METHODS

(75) Inventors: Rex L. Hazelet, Fort Wayne, IN (US); Adam D. Mielke, Fort Wayne, IN (US); David C. Holbrook, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 251 days.

(21) Appl. No.: 13/197,569

(22) Filed: Aug. 3, 2011

(65) Prior Publication Data

US 2013/0036419 A1 Feb. 7, 2013

(51) Int. Cl.
*G06F 9/46* (2006.01)
*G06F 7/00* (2006.01)
*G06F 15/167* (2006.01)

(52) U.S. Cl.
USPC ............ 718/101; 707/600; 709/223; 709/226

(58) Field of Classification Search
None
See application file for complete search history.

(56) References Cited

U.S. PATENT DOCUMENTS

| | | | |
|---|---|---|---|
| 7,860,983 B1 | 12/2010 | Mansfield et al. | |
| 2005/0262194 A1* | 11/2005 | Mamou et al. | 709/203 |
| 2008/0120129 A1 | 5/2008 | Seubert et al. | |
| 2008/0288434 A1 | 11/2008 | De | |
| 2009/0138940 A1* | 5/2009 | Liu et al. | 726/1 |
| 2009/0313599 A1 | 12/2009 | Doddavula et al. | |
| 2011/0098029 A1 | 4/2011 | Rhoads et al. | |
| 2011/0138394 A1 | 6/2011 | Ravishankar et al. | |
| 2011/0288877 A1 | 11/2011 | Ofek et al. | |

OTHER PUBLICATIONS

"International Application Serial No. PCT/US2012/039986, International Search Report mailed Aug. 10, 2012", 2 pgs.
"International Application Seriai No. PCT/US2012/039986, Written Opinion mailed Aug. 10, 2012", 4 pgs.

\* cited by examiner

*Primary Examiner* — Camquy Truong
(74) *Attorney, Agent, or Firm* — Schwegman, Lundberg & Woessner, P.A.

(57) ABSTRACT

A method and system in a Service Orchestration Architecture environment that provides rules engine-based service orchestration, task, and alert management for collaboration between one or more nodes of operation. The system provides multiple levels of configurability. In one aspect, the system includes a rules engine to define the command and control (C2) service orchestration.

17 Claims, 5 Drawing Sheets

DYNAMICALLY CONFIGURABLE COMMAND AND CONTROL SYSTEMS AND METHODS

BACKGROUND

Service orchestration is the combination of individual services into reusable composite services or business processes according to a set of rules. Business Process Execution Language (BPEL) is a widely accepted description language used for service orchestration. BPEL intermingles business process logic with a number of rules to result in static composite services. The ability to quickly change and manage such rules and orchestration is difficult and time-consuming. Such problems are magnified when service orchestration is applied to real-world applications, which have observed rules that are much more dynamic than traditional business processes. Thus, there is a need for a flexible infrastructure and interface to dynamically configure both the service orchestration and rules to allow for real-time changes.

SUMMARY

The present disclosure provides systems and methods for dynamically configuring a command and control system. In one aspect, a system for dynamically configuring command and control services includes memory, a processor, and a user interface, generated at the processor, for receiving an operator input and a configuration input.

The system also includes a service orchestration platform, executing on the processor, to perform service orchestration in response to the operator input. The service orchestration platform includes a plurality of services. Service orchestration is the implementation of one or more services to perform a task.

The system also includes a rules engine, executing on the processor, to implement rules associated with the task and a command and control module, executing on the processor, to modify the rules implemented by the rules engine and modify the service orchestration performed by the service orchestration platform in response to the configuration input. Modifying the service orchestration occurs without modifying the plurality of services.

In another aspect, a method for dynamically configuring command and control services includes receiving an observation at a first user interface, receiving input at a second user interface, and modifying at least one of a service orchestration and a rule, based on the input. The service orchestration is performed by a service orchestration platform and the rule implemented by a rule engine. The service orchestration modification occurs without modifying an underlying service. The method also includes executing the modified service orchestration to perform a task.

In yet another aspect, a system for dynamically configuring command and control services including a memory, at least one processor, and a database that includes event data, rules data, policy data, and asset data. The system includes an operator user interface, generated at the at least one processor, to receive an observation and an administrator user interface, generated at the at least one processor, to receive an input.

The system also includes a service orchestration platform, executing on at least one processor that includes a plurality of services to perform service orchestration in response to the observation. The service orchestration implements one or more tasks. The system includes a rules engine, executing on at least one processor that includes an event manager and an asset manager. The rules engine implements rules associated with the tasks to be performed. The system also includes a command and control configuration module, executing on at least one processor, to modify at least one of the rules and the service orchestration in response to the input, without modifying the plurality of services.

DETAILED DESCRIPTION

Figure 1:
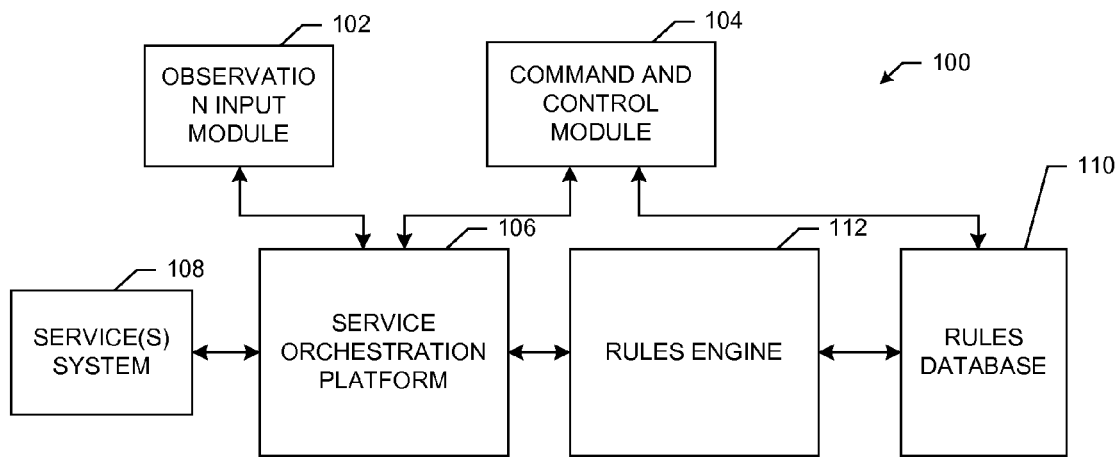
FIG. 1 depicts an embodiment of the dynamic command and control system in accordance with an aspect of the present invention.

Aspects of a Dynamic and configurable Command and Control (C2) system described herein provide the ability to configure and modify both the service orchestration and the rules used to automate decisions for a variety of new and existing C2 systems in real time and without the need to consult with the individual developers of the C2 systems.

By way of example and not limitation, C2 systems include software and hardware for receiving input data and ultimately producing one or more outputs, including instructions to carry out one or more actions, in response to the input data. C2 systems are typically used for controlling multi-faceted operations Typically, C2 systems operate by executing one or more software applications on one or more processors in conjunction with an arrangement of equipment, facilities, and special purpose computing devices. Web-enabled technologies are often used to gain access to, coordinate, and integrate existing C2 systems, applications, and data services to perform the desired high-level functions.

In one aspect, C2 systems are often employed by military personnel. In this aspect, a military C2 system typically includes at least two classes of users. For example, one user of the C2 system may be an operator. An operator typically inputs data and observations that are acted upon by the C2 system to cause a particular output or outcome. By way of example and not limitation, an operator may be a soldier, spotter, or observer in the field. Other personnel may serve as operators, including commanding officers.

Another class of C2 system users includes administrators. An administrator has the appropriate permissions to create, modify, and/or delete one or more aspects of the C2 system. For example, an administrator may alter one or more rules that interpret the input data and alter the outcome that results from the interpretation of the data.

In one aspect, an exemplary C2 system is used to control weapons and weapons systems in a combat environment to integrate inputs from multiple disparate C2 applications relating to visual observations, radar and sonar targeting observations, weapons systems inputs, and medical observations related to military personnel. Ordinarily, such C2 systems are exceedingly complex, as they integrate data and inputs from a number of diverse and disparate C2 software applications. In another aspect, the dynamic C2 system of the present disclosure allows for real-time configuration and modification of both the service orchestration and the rules implemented by a C2 system.

Various aspects of the dynamic C2 system include a framework that uses a rules engine based service orchestration to define service orchestration and service behavior. Once the service orchestration and the rules have been defined, aspects of the dynamic C2 system allow for the dynamic modification of the rules implemented by the rules engine. Other aspects of the dynamic C2 system allow for the dynamic modification of the C2 service orchestration and service behavior without requiring changes to existing software. Various aspects of the dynamic C2 include task manager services, alert services, and workflow tracing services for coordinating and communicating with clients.

FIG. 1 depicts an embodiment of the dynamic C2 system, indicated generally as 100. The C2 system 100 includes a number of components that are executable by one or more computing devices having one or more processors. In one aspect, the C2 system 100 includes an observation input module 102, a command and control module 104, a service orchestration platform 106, one or more services systems 108, a rules database 110, and a rules engine 112.

The observation input module 102 receives input used by the service orchestration platform 106. The inputs may include observations, commands, message events, or other instructions that cause the service orchestration platform 106 to carry out one or more service orchestration processes. A message event refers to an event regarding the delivery, display, and composition of a message.

In one aspect, the observation input module 102 includes a user interface that allows a user, such as a field operator, to enter observation data. The user may be an administrative user, a field operator or any other person or device that inputs and/or receives data to and from the C2 system 100. As used herein, a field operator refers to a user who does not have administrative capabilities to alter the C2 system 100. For example, in a military setting, a field operator may input observation data relating to an ammunition type, an ammunition request, or report a lack of particular ammunition into the user interface. After entering observation data, the field operator transmits the data to the service orchestration platform 106. Based on the received observation data the service orchestration platform 106, initiates at least one service orchestration process to perform a particular C2 system task related directly or indirectly to the ammunition.

The command and control module 104 permits the real-time modification of both service orchestration processes and one or more rules in a service orchestrated system, such as the C2 system 100. A service orchestration process is the automated arrangement, coordination, and management of computer systems, middleware, services, and other applications.

By way of example and not limitation, a service orchestration process as performed by the service orchestration platform 106 includes the automation, arrangement, coordination, and management of services such as task management, alert management, surveillance, fire support, and communication services. The services being orchestrated may be separate distinct services or two or more services may be incorporated into a single service. The services may also be encoded in one ore more computer systems, including the C2 system 100.

In one aspect, the command and control module 104 includes a user interface that allows an operator to dynamically change both one or more rules and one or more service orchestration process of a system without the need to contact the individual service providers or service programmers and without the need integrate with another existing C2 application. For example, a user of the C2 system 100 may interact with a user interface generated by the command and control module 104 to input data. The input data may include rule data that relates to the modification and/or execution of rules and/or service orchestration data that relates to the modification and/or execution of a service orchestration process. After the user enters the rule data and/or service orchestration data, the command and control module 104 transmits the data to the service orchestration platform 106 or the rules database 110, as determined by the type of data input by the user.

The service orchestration platform 106 implements a service oriented architecture (SOA) to facilitate the orchestration of one or more services and service systems in response to the input service orchestration data. SOA generally describes the automated arrangement, coordination, and management of heterogeneous computer systems. Specifically, SOA encapsulates and abstracts the functionality and implementation details of each heterogeneous computer system into a number of individual services. Using a description language, such BPEL, the individual services may be subsequently combined into composite services or processes that are executed according to a set of rules. In one aspect, the service orchestration platform 106 may be used to combine various capabilities and functionalities of existing C2 system applications as discrete services. Subsequently, the service orchestration platform 106 may automate and coordinate the discrete services to perform command and control tasks. By way of example and not limitation, the service orchestration platform 106 may combine the functionalities of a video surveillance application, an intruder alert application, and a security patrol application into a single security service.

In another aspect, the service orchestration platform 106 receives service orchestration data from the command and control module 104. Subsequently, the service orchestration platform 106 may modify and or initiate a service orchestration process performed by the platform based on the received service orchestration data.

The service system 108 includes one or more applications or composite services that are further initiated, executed, combined, and/or coordinated by the service orchestration platform 106. In one aspect, the service system 108 may be developed and sold by a third-party vendor and include one or more services and applications from the same or different third-party vendors. In another aspect, the service system 108 and/or the one or more services and applications may be provided by a user of the dynamic C2 system. In yet another aspect, the service system 108 may include a combination of user provided and third-party provided services and applications.

The rules database 110 receives and stores rule data as one or more rules. In addition, rule data may be used at the rules database 110 to modify existing rules or create new rules. Subsequently, the rules database 110 stores the new rules and/or modified rules into memory. A user enters rules data into the command and control module 104 to create, delete, and/or modify the rules stored in the rules database 110.

In one aspect, a rule is an abstract structure that defines or constrains the execution of one or more services in an SOA.

Rules are intended to assert structure or to control the behavior of the C2 system orchestration. Additionally, rules may dictate the performance of actions, provide information, and/or help process messages. Rules may include conditional elements (e.g., and, or, not, exists, etc.), constraints (e.g., equal to, not equal to, greater than, contains, etc.) and outputs or actions (e.g., decrypt message, process next rule, forward message to aspect server, forward message to application server, initiate an aspect service, etc.).

The rules database 110 is a general data storage device that includes one or more processors and volatile and/or nonvolatile memory. The rules database 110 may be a data storage structure or a data storage system executed by the one or more processors on a data storage server. The rules database 110 stores data including, but not limited to rule data, rule identification data, rule description data, and/or any other data relating to one or more rules.

In various aspects, the rules database 110 is maintained in numerous formats. By way of example and not-limitation, the rules database 110 may be a structured SQL database or an unstructured XML-based database defined by an appropriate schema. In another aspect, the rules database 110 may be a database server. In other aspects, the rules database 110 communicates with a rules engine 112.

In one aspect, the rules stored in the rules database 110 may be modified using a JSR-94-based rules management system. The rules may be modified in response to inputs received at the command and control module 104. In another aspect, the rules may be modified using a Drools business process management system.

The rules engine 112 is a system that executes one or more rules in a service orchestration environment. In one aspect, the rules engine 112 is a logic component that processes one or more rules to produce one or more outcomes. By way of example and not limitation, the rules engine 112 compares input data and rule data to infer conclusions which may result in specific actions or events. The rules engine generates rule outcomes based on the input data and the rule data.

In other aspects, the rules engine 112 is encoded as software, or is embodied as a combination of software and hardware. The rules engine 112 generally provides the ability to access, apply, define, classify, and manage rules. The rules engine 112 accesses the rules database 110 in order to inform the service orchestration platform 106 of the services that should be invoked. For example, the rules engine 112 applies rules stored in the rules database 110 to determine which service orchestration processes should be performed by the service orchestration platform 106, in response to an observation input.

Figure 2:
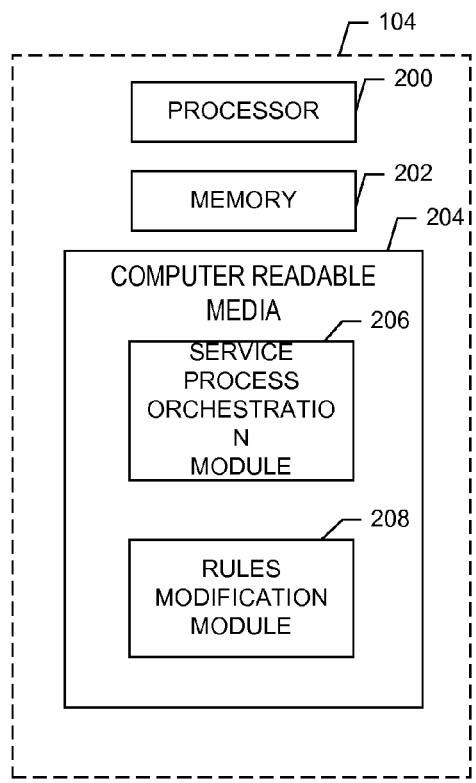
FIG. 2 is a block diagram depicting one embodiment of the command and control module in accordance with one aspect of the present invention.

FIG. 2 is a block diagram depicting one embodiment of the command and control module 104. In one aspect, the command and control module 104 includes a processor 200 that executes one or more modules to implement and modify a service orchestration process and the rules within the rules database 110. The command and control module 104 may also include memory 202 as well as other computing components. In various aspects, the command and control module 104 resides on a computing device or other processing system.

The modules of the command and control module 104 are encoded on a computer readable media ("CRM") 204. The CRM 204 may include volatile media, nonvolatile media, removable media, non-removable media, and/or other media or mediums that can be accessed by a general purpose or special purpose computing device. For example, computer-readable media may include computer storage media and communication media. Computer storage media further may include volatile, nonvolatile, removable, and/or non-removable media implemented in a method or technology for storage of information, such as computer-readable instructions, data structures, program modules, and/or other data. Communication media may embody, for example, computer-readable instructions, data structures, program modules, algorithms, and/or other data. The communication media may include an information delivery method. The communication media may include wired and wireless connections and technologies and be used to transmit and/or receive wired or wireless communications. Combinations and permutations of the above systems and components described herein may be made.

In one aspect, the command and control module 104 includes a service process orchestration module 206 and a rules modification module 208. In various aspects, other modules may be included.

The service process orchestration module 206 generates a process configuration user interface through which a user may modify or configure the orchestration of the service processes performed by the service orchestration platform 106. In one aspect, the process configuration user interface is a graphical user interface (GUI). In another aspect, the process configuration user interface is a text-based interface. In all aspects, the process configuration user interface permits the creation, modification, and/or deletion of a service orchestration process.

The rules modification module 208 generates a rule modification user interface through which a user may modify one or more rules stored in the rules database 110. In one aspect, the rule modification user interface is a graphical user interface (GUI). In another aspect, the rule modification user interface is a text-based interface. In all aspects, the rule modification user interface permits the creation, modification, and/or deletion of a rule that is implemented by the rules engine 112.

Figure 3:
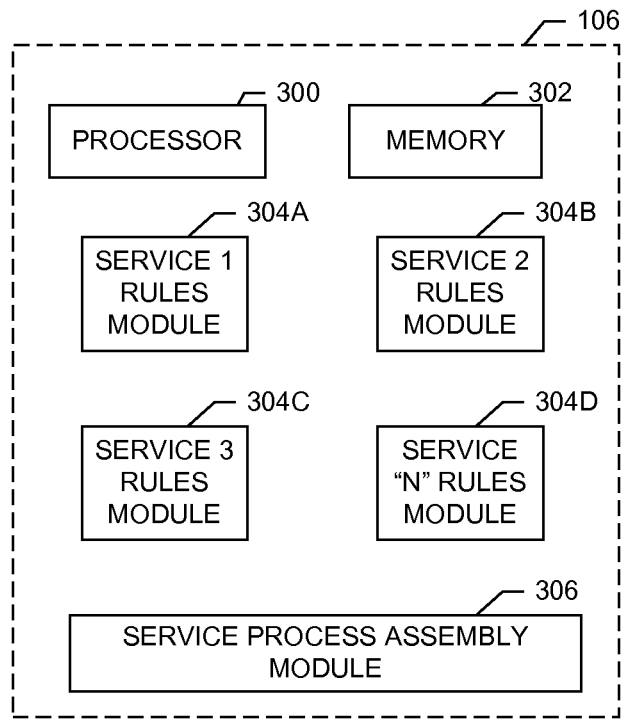
FIG. 3 is a block diagram depicting one embodiment of the service orchestration platform in accordance with an aspect of the present invention.

FIG. 3 is a block diagram depicting one embodiment of the service orchestration platform 106. The service orchestration platform 106 includes a processor 300, memory 302, one or more service rules modules 304A-D that correspond to one or more services, such as the service 106, a service process assembly module 306.

In one aspect, the service rules module 304A receives input from the corresponding service module, such as the service module 106, the rules engine 112, the observation input module 102, and the command and control module 102 to process and implement a service based. By way of example and not limitation, the service modules 300A-D receive observation data from the observation input system 101 and rule outcomes from the rules engine 112 that is processed to determine if the corresponding service is to be initiated.

In another aspect, the service process assembly module 306 coordinates the execution of the services initiated at the service rules modules 300A-D. For example, the service process assembly module 306 coordinates the execution of two or more services to insure that the services are carried out in a particular order. The order in which the services process is assembled may be determined by the service system 108, administrator input received from the command and control module 104, and/or rule data stored in the rules database.

In another aspect, the service process assembly module 306 may execute one or more services not initiated by the service rules modules 304A-D, in response to administrator input from the command and control module 104. In this aspect, the administrator may elect to modify an existing service process to include one or more additional services or re-executing one or more services within the process. Similarly, the administrator may elect to omit one or more services that would ordinarily be initiated by the service orchestration platform 106.

In other aspects, the administrator may create a new service process that supersedes any or all existing processes. In all aspects, the administrator may control and modify, in real time, the outputs or generated instructions to carry out an activity by the C2 system. The real-time modification may be accomplished through modifying service processes and/or the rules.

Figure 4:
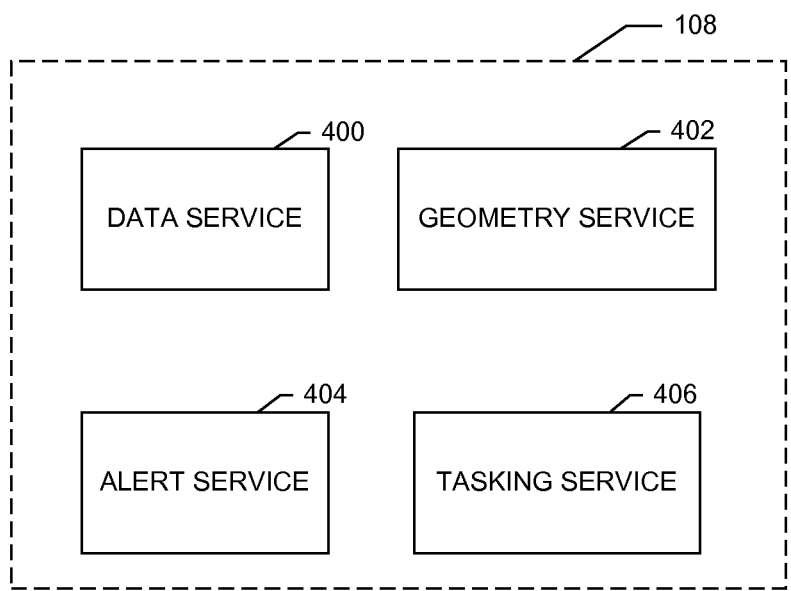
FIG. 4 is a block diagram depicting an embodiment of the service system in accordance with an aspect of the present invention.

FIG. 4 is a block diagram depicting an embodiment of the service system 108. In one aspect, the service system 108 is composed of one or more discrete services or applications. The service system 108 may be a new or existing third-party system that includes one or more services and applications from the same or different third-party vendors. In another aspect, the service system 108 and/or one or more services and applications may be provided by the user of the dynamic C2 system. In yet another aspect, the service system 108 may include a combination of user provided and third-party provided services and applications. As such, the C2 system 100 may be used with commercial available C2 systems and components, as well as customized C2 systems already in use.

By way of example and not limitation, the service system 108 may include a data service 400, a geometry service 402, an alert, service 404, and a tasking service 406. Other services may be included. In this example, the data service 400 stores, retrieves, and/or generates data. The data service 400 may retrieve data regarding a target or an area of operation (AO) from a database, in response to an observer input. The data service 400 may also broadcast the data to one or more users as determined by the appropriate rules that identify the appropriate recipients.

The geometry service 402 utilizes a variety of methods and algorithms to generate sophisticated and frequently used positioning and telemetry operations. In one aspect, the geometry service 402 is used to coordinate the spatial locations of one more units and assets. In another aspect, the geometry service 402 is used to coordinate indirect fire support, such as from field artillery.

The alert service 404 provides surveillance and alert operations. The alert service 404 may be initiated by an observation input or in response to one or more other services. The alert service 404 may alert one or more users of the C2 system or other designated recipients of an event. For example, the alert service 404 may be initiated when an unknown object enters a secured area and alert the appropriate users, systems, or devices. In this example, the alert service 404 may also track and follow the unknown object using video or other surveillance.

The tasking service 406 assigns and manages one or more units or assets to a particular tack or operation. For example, the tasking service 406 may assign a patrol unit or resource to a particular AO. The tasking service 406 may therefore, be used in conjunction with the geometry service 402 to coordinate units and assets.

In various aspects, the services 400-406 may be initiated simultaneously. In other aspect, the services may be initiated in a particular sequence in response to one or more observation inputs or administrative inputs. For example, an observation input may indicate that an unknown vehicle has entered a secured area. In response, the service orchestration platform 106 may initiate the alert service 404 to notify the appropriate systems and/or individuals and to begin electronic surveillance of the vehicle. Simultaneously, the data service 400 retrieves any data relevant to the observed vehicle and transmits the data to the appropriate systems and/or individuals.

In response, to the data generated by the data service 400, the service orchestration platform 106 may also initiate the tasking service 406 to assign one or more units to investigate and stop the unknown vehicle. If multiple units are tasked to investigate, the geometry service 402 may further coordinate the movements of the responding units to ensure that the vehicle cannot leave without being properly investigated. The service system 108 may include additional services as dictated by the intended use of the dynamic C2 system 100.

Figure 5:
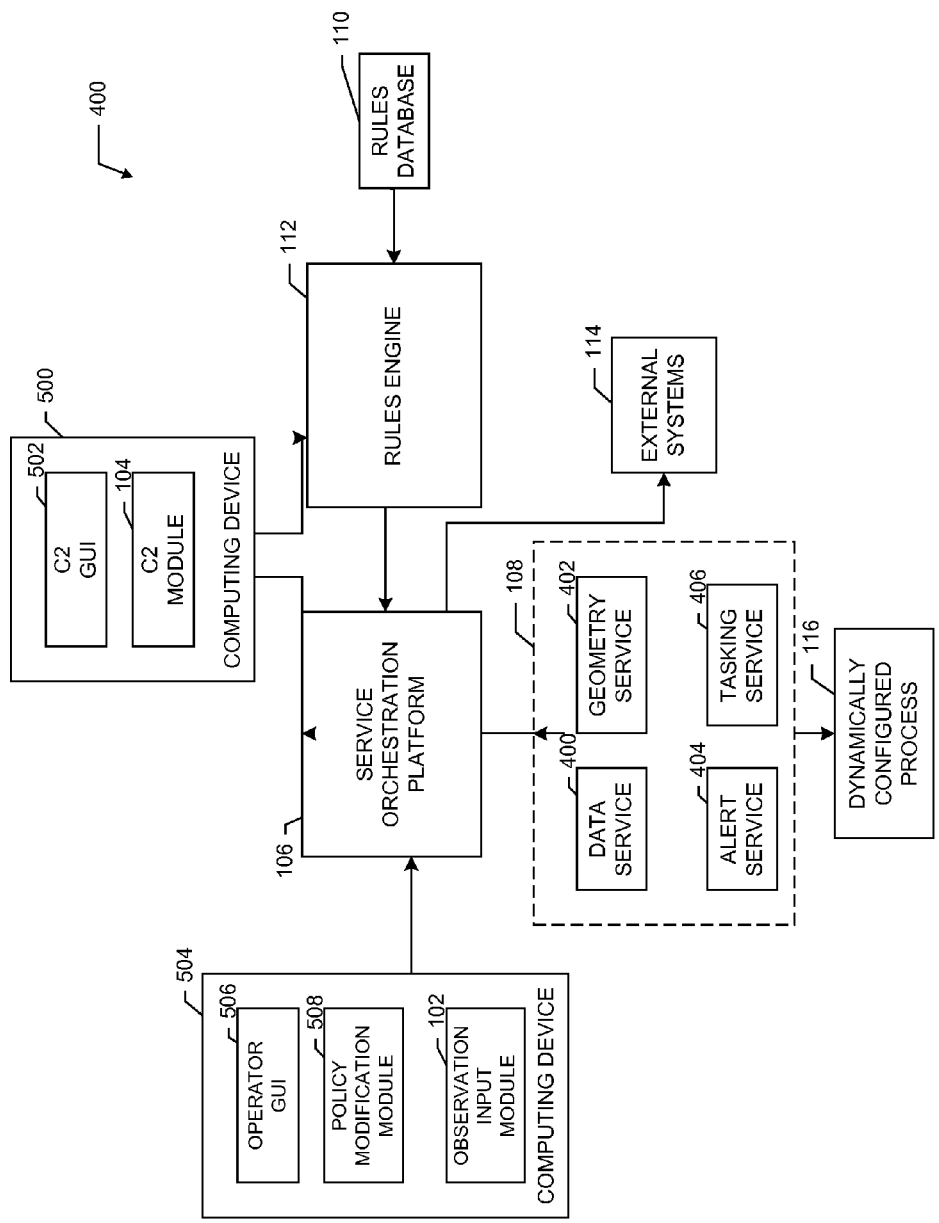
FIG. 5 depicts a block diagram of an embodiment of the dynamic command and control system in accordance with an aspect of the present invention.

FIG. 5 depicts a block diagram of an embodiment of the C2 system 100. As shown, the command and control module 102 is executed on a computing device such as the computing device 500. The computing device 500 may include one or more processors, volatile and/or nonvolatile memory, computer readable media, a display device, a mouse, a trackball, touch pad, or other pointer, a keyboard, another data entry or input device or system and/or a combination of the foregoing. The computing device 500 displays a C2 input GUI 502 generated by the C2 module 102, whereby the administrator may interact with the service orchestration platform 106, rules database 110, and/or the rules engine 112 of the C2 system 100.

In one aspect, the observation input module 112 is also executed on a computing device 504 that is similar to the computing device 500. The computing device 502 also displays an operator input GUI 506 generated by the observation input module 112, whereby an observer may input observation data to be received by the service orchestration platform 106.

The computing device 504 also executes a policy modification module 508. The policy modification module 508 permits the observer to create, modify, and/or delete a policy that is relied upon by the service orchestration platform 106. As used herein, a policy refers to a criteria used by the rules engine 112 for evaluating one or more rule in combination with the input observations, In one aspect, a policy dictates if type of service or service process applies to a type of observation or specific data with an observation input. In another aspect, a policy dictates if type of service or service process applies to a type of observation or specific data with an observation input.

By way of example and not limitation, a friend policy for friendly or allied units and structures, while a foe policy for enemy units and structures may be applied to all observer inputs regarding potential targets observed in the field. If an enemy policy is elected and the observer inputs an observation that identifies an unknown vehicle in an area of operation (AO), the service orchestration platform 106 assembles processes that are suitable for surveilling, targeting, and/or attacking the unknown vehicle. If the observer determines that all vehicles in the AO or friendly units, the observer may modify the current policy and use a friend policy. Policy modification permits the observer to quickly, efficiently, and indirectly change the system processes in real-time. As such, the observer may change the policy before communicating such information to the administrator for direct modification to the rules and or service processes.

In another example, an observer may note that what had previously been identified as a number of friendly targets or an allied-controlled AO is now under the control of enemy units. As such, the observer can quickly change the policy, without having to re-enter observation data for each target or asset in the AO.

In various aspects, the computing devices 502 and 504 may be located remotely from the service orchestration platform 106 and rules engine 112. In these aspects, the computing devices may communicate with the various components of the C2 system 100 via a network, such as the internet.

Figure 6:
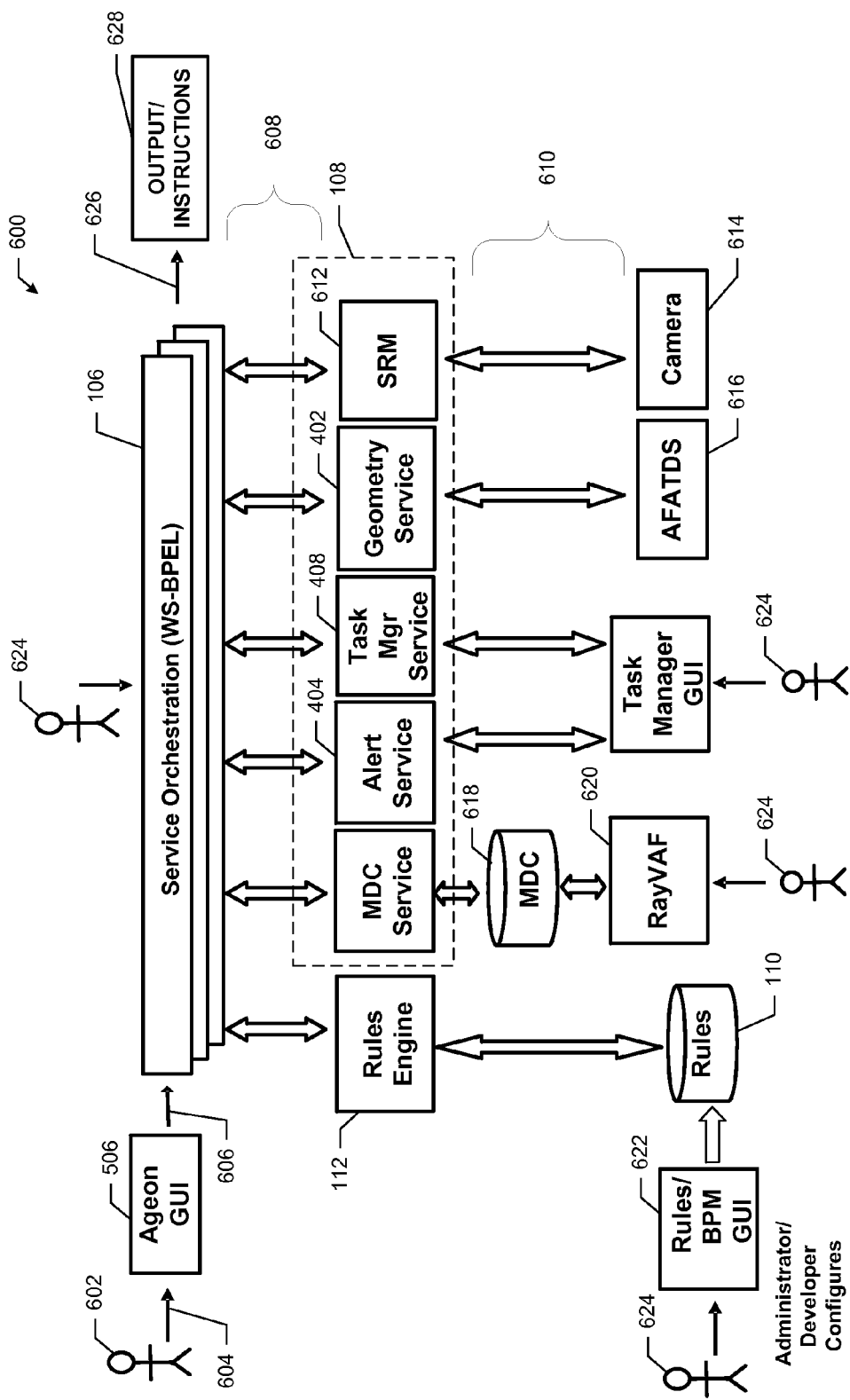
FIG. 6 depicts a workflow of an embodiment of the dynamic command and control system in accordance with an aspect of the present invention.

FIG. 6 depicts a workflow 600 of an embodiment of the C2 system 100, as used in operations processing. In one aspect, an operator 602 interacts with a C2 GUI 506 to input 604 observation data. By way of example and not limitation, the C2 GUI 506 may be generated by a third-party and/or commercially-available application such as the Ageon Intelligence, Surveillance & Reconnaissance (ISR) software package. Other applications may also be used.

The observation data is then transmitted, as indicated by 606, to a service orchestration platform 106. In one aspect, the service orchestration platform 106 is based on the Web Services Business Process Execution Language (WS-BPEL). The service orchestration platform 106 is in communication 608 with a service system 108. By way of example, the service modules 106 may include the alert service 400, the geometry Service 402, and the tasking service 406. Additional modules for performing overlapping, similar, dissimilar, or even disparate services may also be included in the service system 108.

The various services of the service system 108 may also communicate 610 with corresponding devices or databases. By way of example and not limitation, the Sensor Resource Manager (SRM) service 612 is in communication with one or more security and surveillance cameras 614. Similarly, the geometry service 402 is in communication with an Advanced Field Artillery Tactical Data System (AFATDS) 616 to coordinate the deployment and use of field artillery. In one aspect, the Meta Data Catalog (MDC) service is in communication with a database 618. The database 618 is also in communication with a Raytheon Visualization Access Framework (RayVAF) 620, or another web-based visualization framework.

In another aspect, the service orchestration platform 106 is also in communication with the rules engine 108. The rules engine 108 communicates with the rules database 110. In this aspect, the rules stored in the rules database 110 may be modified using the service orchestration platform 106 through interaction with the rules engine 108 or through instructions received from a Rules/Business Process Management (BPM) GUI 622.

In one aspect, as depicted, an administrator 624 of the C2 system 100 may interact with the service orchestration platform 106, a GUI configured to send instructions to the tasking service 406, the rules/BPM GUI 622, and the RayVAF 620. In other aspects, the administrator 624 may interact with modules or interfaces to dynamically configure and/or modify the rules and/or the orchestration of the services.

In response to the observation data input 602 by the operator 600 and the orchestration of services that may or may not be modified by the administrator 622, the C2 system 100 may generate 626 data or instructions that cause at least one activity to be performed, generally indicated as 628. In one aspect, the output activity 626 may prompt a number of external systems, devices, or personal to take a specific action. In another aspect, an activity may not be caused by the C2 system 100; however, data may be stored or updated within the C2 system.

Figure 7:
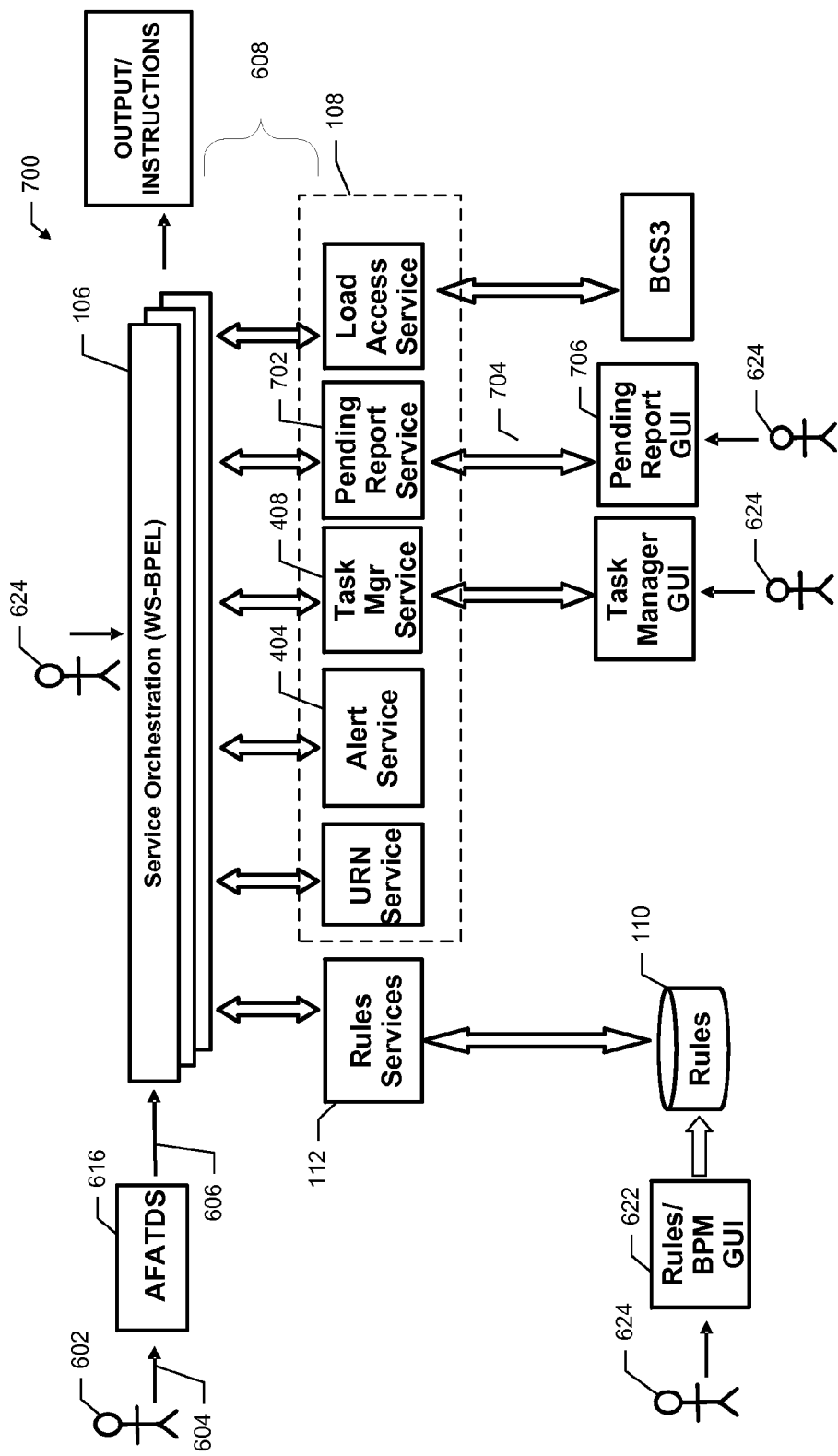
FIG. 7 depicts a workflow 700 of an embodiment of the dynamic command and control system in accordance with an aspect of the present invention.

FIG. 7 depicts a workflow 700 of an embodiment of the dynamic C2 system 100. In one aspect, the C2 system may be used for logistics processing. In this aspect, the operator 602 inputs 604 observation data regarding the amount of ammunition remaining at one or more field artillery teams into an interface of an AFATDS 616. This observation is then transmitted 606 to the service orchestration platform 106. In one aspect, the observation data undergoes a data transformation at the service orchestration platform 106. The transformed data may then be transmitted 608 to one or more of the service modules 106.

By way of example and not limitation, the data may be received at a pending report service module 702. The pending report service module 702 generates a report related to the transformed data that is then transmitted 704 and, in one aspect, displayed at a pending report GUI 706. The report may be used to seek further input or approval from personnel having decision-making authority. In one aspect, the approval of the generated report is required to continue the logistical workflow of the C2 system 100. In another aspect, the C2 system 100 proceeds with logistical and/or operational processes without waiting for the approval of a generated report.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A system for dynamically configuring command and control services comprising:
    memory for storing data;
    a processor, coupled to memory, the processor arranged to implement a command and control system, the command and control system including:
        an observation input module including an observation input user interface generated by the processor, the observation input user interface arranged to receive system input from a user;
        a command and control module including a command and control user interface generated separate from the observation input user interface by the processor, the command and control user interface arranged to receive rules data input and service orchestration data input from user input for defining rules and service orchestration processes;
        a rules database arranged to store the rules and to receive the rules data input defining the rules, the rules in the rules database being maintained according to the rules data input, the command and control module providing rules data input directly to the rules database;
        a rules engine, executing on the processor, arranged to evaluate the rules in the rules database based on a user defined policy; and
        a service orchestration platform arranged to receive the system input from the observation input module, service orchestration data input from the command and control module associated with performing the service orchestration processes, and evaluated rules provided by the rules engine for defining service orchestration processes, the service orchestration processes orchestrating execution of services to perform a task based on the system input from the observation input module, the evaluated rules from the rules engine and the service orchestration data input from the command and control module without modifying the services.

2. The system of claim 1, wherein the system input comprises an operator observation.

3. The system of claim 1, wherein the system input comprises a message event.

4. The system of claim 1, wherein the service orchestration platform further comprises a plurality of service rules modules arranged to implement the services.

5. The system of claim 1, wherein the rules engine comprises an event manager and an asset manager.

6. The system of claim 1, wherein the rules engine comprises a plurality of command and control rules stored in the memory, at least one of the plurality of command and control rules is associated with an event, policy, guidance, or asset.

7. The system of claim 1, wherein the task comprises the execution of at least one service.

8. The system of claim 1, wherein the service orchestration platform is based on a Web Services Business Process Execution Language (WS-BPEL).

9. The system of claim 1, wherein the rules data input is used by the rules database to modify the rules using a JSR-94-based rules management system.

10. The system of claim 1, wherein the rules data input is used by the rules database to modify the rules using a Drools business process management system.

11. The system of claim 1, wherein the rules database modifies the rules and the service orchestration platform modifies the service orchestration processes in response to the system input.

12. The system of claim 1 wherein the services further comprise a task service and an alert service.

13. The system of claim 1 further comprising a database, the database storing event data, policy data, and asset data.

14. The system of claim 1, wherein the rules engine comprises an event manager and an asset manager, the rules engine implementing rules associated with the tasks to be performed.

15. A method for dynamically configuring command and control services comprising:
- receiving system input from a user at an observation input user interface generated by a processor;
- receiving, at a command and control user interface separate from the observation input user interface by the processor, rules data input and service orchestration data input for defining rules and service orchestration processes;
- receiving, at a rules database, the rules data input defining the rules directly from the command and control interface;
- storing the rules defined by the rules data input at the rules database;
- evaluating, at a rules engine, the rules from the rules database based on a user defined policy;
- receiving, at a service orchestration platform, the system input from the observation input user interface, service orchestration data input from the command and control user interface associated with performing the service orchestration processes, and evaluated rules provided by the rules engine for defining the service orchestration processes; and
- orchestrating, at the service orchestration platform, execution of services to perform a task based on the system input from the observation input user interface, evaluated rules from the rules engine and the service orchestration data input from the command and control user interface without modifying the services.

16. The method of claim 2 wherein the system input is based upon to the observation.

17. The method of claim 2, further comprising:
- modifying a rule implemented by a rules engine, the rule modification based upon the an observation provided by the system input.

\* \* \* \* \*

UNITED STATES PATENT AND TRADEMARK OFFICE
CERTIFICATE OF CORRECTION

PATENT NO. : 8,719,824 B2
APPLICATION NO. : 13/197569
DATED : May 6, 2014
INVENTOR(S) : Hazelet et al.

It is certified that error appears in the above-identified patent and that said Letters Patent is hereby corrected as shown below:

In the Drawings

Sheet 3 of 5, Fig. 5, reference numeral 400, delete "400", therefor

In the Specification

Column 2, line 44, after "operations", insert --.--, therefor

Column 4, line 2, delete "ore" and insert --or--, therefor

Column 6, line 43, delete "304A" and insert --304A-D--, therefor

Column 6, line 46, delete "102" and insert --104--, therefor

Column 6, line 48, after "service", insert --rules--, therefor

Column 6, line 48, delete "300A-D" and insert --304A-D--, therefor

Column 6, line 54, delete "300A-D." and insert --304A-D.--, therefor

Column 7, line 26, delete "alert," and insert --alert--, therefor

Column 8, line 14, delete "102" and insert --104--, therefor

Column 8, line 26, delete "112" and insert --102--, therefor

Column 8, line 30, delete "112," and insert --102,--, therefor

Column 9, line 20, delete "400," and insert --404,--, therefor

Column 9, line 39, delete "108" and insert --112--, therefor

Signed and Sealed this
Eighteenth Day of November, 2014

Michelle K. Lee
*Deputy Director of the United States Patent and Trademark Office*

CERTIFICATE OF CORRECTION (continued)
U.S. Pat. No. 8,719,824 B2

Column 9, line 40, delete "108" and insert --112--, therefor

Column 9, line 43, delete "108" and insert --112--, therefor

Column 9, line 53, delete "602" and insert --604--, therefor

Column 9, line 54, delete "600" and insert --602--, therefor

Column 9, line 55, delete "622" and insert --624--, therefor

Column 10, line 5, delete "608" and insert --606--, therefor

In the Claims

Column 12, line 29, in Claim 16, delete "claim 2" and insert --claim 15--, therefor Column 12, line 31, in Claim 17, delete "claim 2," and insert --claim 15,--, therefor

UNITED STATES PATENT AND TRADEMARK OFFICE
CERTIFICATE OF CORRECTION

PATENT NO. : 8,719,824 B2
APPLICATION NO. : 13/197569
DATED : May 6, 2014
INVENTOR(S) : Hazelet et al.

Page 1 of 2

It is certified that error appears in the above-identified patent and that said Letters Patent is hereby corrected as shown below:

On the title page, in the illustrative figure, reference numeral 400, delete "400", therefor In the Drawings Sheet 3 of 5, Fig. 5, reference numeral 400, delete "400", therefor In the Specification Column 2, line 44, after "operations", insert --.--, therefor Column 4, line 2, delete "ore" and insert --or--, therefor Column 6, line 43, delete "304A" and insert --304A-D--, therefor Column 6, line 46, delete "102" and insert --104--, therefor Column 6, line 48, after "service", insert --rules--, therefor Column 6, line 48, delete "300A-D" and insert --304A-D--, therefor Column 6, line 54, delete "300A-D." and insert --304A-D.--, therefor Column 7, line 26, delete "alert," and insert --alert--, therefor Column 8, line 14, delete "102" and insert --104--, therefor Column 8, line 26, delete "112" and insert --102--, therefor This certificate supersedes the Certificate of Correction issued November 18, 2014.

Signed and Sealed this
Twentieth Day of January, 2015

Michelle K. Lee
*Deputy Director of the United States Patent and Trademark Office*

Column 8, line 30, delete "112," and insert --102,--, therefor

Column 9, line 20, delete "400," and insert --404,--, therefor

Column 9, line 39, delete "108" and insert --112--, therefor

Column 9, line 40, delete "108" and insert --112--, therefor

Column 9, line 43, delete "108" and insert --112--, therefor

Column 9, line 53, delete "602" and insert --604--, therefor

Column 9, line 54, delete "600" and insert --602--, therefor

Column 9, line 55, delete "622" and insert --624--, therefor

Column 10, line 5, delete "608" and insert --606--, therefor

In the Claims

Column 12, line 29, in Claim 16, delete "claim 2" and insert --claim 15--, therefor Column 12, line 31, in Claim 17, delete "claim 2," and insert --claim 15,--, therefor